United States Patent [19]

Kiba et al.

[11] Patent Number: 4,988,260
[45] Date of Patent: Jan. 29, 1991

[54] AUTOMOBILE DOOR OPENING/CLOSING EQUIPMENT

[75] Inventors: Hiroshi Kiba; Yutaka Shintaku, both of Hiroshima, Japan

[73] Assignee: Mazda Motor Corporation, Hiroshima, Japan

[21] Appl. No.: 250,486

[22] Filed: Sep. 23, 1988

[30] Foreign Application Priority Data

Sep. 30, 1987 [JP] Japan .................. 62-244165

[51] Int. Cl.$^5$ .................. B25J 19/02
[52] U.S. Cl. .................. 414/744.1; 118/326; 118/698; 239/105; 901/7; 901/43
[58] Field of Search .................. 414/680, 744.1, 744.3; 901/43, 7; 239/105; 118/698, 326

[56] References Cited

U.S. PATENT DOCUMENTS

| | | | |
|---|---|---|---|
| 2,896,854 | 7/1959 | Noble et al. | 239/105 |
| 4,342,535 | 8/1982 | Bartlett et al. | 414/744.4 |
| 4,342,536 | 8/1982 | Akeel et al. | 414/744.4 |
| 4,423,999 | 1/1984 | Choly | 414/744.5 |
| 4,498,414 | 2/1985 | Kiba et al. | 118/663 |
| 4,546,724 | 10/1985 | Kiryu et al. | 901/43 |

Primary Examiner—Robert J. Spar
Assistant Examiner—Donald W. Underwood
Attorney, Agent, or Firm—Wenderoth, Lind & Ponack

[57] ABSTRACT

An automobile door opening/closing device according to the present invention is provided with a robot arm capable of moving horizontally toward a door, a non-contact type sensor attached to the robot arm for detecting an upper edge shape of the door, an engaging rod attached to the robot arm and adapted to be moved vertically for insertion thereof into a glass slot of the door, and a drive means for driving the engaging rod. In operation, the robot arm is moved horizontally toward the door in close proximity to the upper edge of the door, and when the non-contact type sensor detects a specific shape of the upper edge of the door, the drive means is operated to insert the engaging rod into the glass slot, and the door is then opened or closed by a horizontal movement of the robot arm. Under this construction, not only can the distance between the non-contact type sensor and the upper edge of the door be shortened to ensure detecting the position of the door by the sensor, but also the engaging rod can be inserted into the glass slot without contacting a coated surface of the door.

15 Claims, 4 Drawing Sheets

AUTOMOBILE DOOR OPENING/CLOSING EQUIPMENT

BACKGROUND OF THE INVENTION

1. Field of Art

The present invention relates to an improvement of a door opening/closing device for use in an automobile coating line.

2. Prior Art

Recently the coating work for automobile bodies has been automated for even minute portions of the automobile bodies, particularly doors, due to the introduction of coating robots. Where a door is to be painted automatically by means of a coating robot, it is necessary to open and close the door in order to coat the back of the door. However, providing a special robot for opening and closing of the door causes increased equipment costs. In view of this, there has been proposed a coating robot with a door opening/closing device attached thereto (see U.S. Pat. Nos. 4,342,535; 4,342,536; and 4,498,414).

FIGS. 1 to 5 show an example of such a combination type coating robot. As illustrated therein, an engaging rod 5 and a spray gun 4 are attached to the tip end of an arm 3 of a coating robot 2 disposed adjacent a conveyor line 1. The engaging rod 5, as shown in FIG. 4, is capable of being inserted into a glass slot 7 of a door 6. When the engaging rod 5 is so inserted, the arm 3 is moved horizontally to thereby open or close the door 6. An optical sensor 8 is disposed beside the base end portion of the engaging rod 5. When the optical sensor 8 detects a specific shape (in this case an edge portion 9) serving as an indication of the upper edge of the door 6 during the horizontal movement of the tip end of the arm 3, the arm tip end moves downward, thus causing the engaging rod 5 to be inserted into the glass slot 7. The dash-double dot lines in FIGS. 2 and 3 represent a moving range of the arm 3.

FIG. 5 shows an example of a door opening/closing device having a pivotable engaging rod 10 which represents an improvement over the above prior art. In this device, the engaging rod 10 is pivotable counterclockwise in FIG. 5 from a vertical state about a pin 11, but is not pivotable in the clockwise direction. As the tip end of the arm 3 is moved in the horizontal direction, the engaging rod 10 moves over the upper edge of the door 6 and comes into engagement with the glass slot 7. The use of such a pivotable engaging rod 10 allows the number of operations of the arm 3 to be decreased by one compared to the use of the engaging rod shown in FIG. 4, thus permitting quick opening and closing motion of a door.

Construction of the conventional door opening/closing device is as outlined above, but the following have been pointed out as problems connected with such conventional devices.

In the type wherein the stationary engaging rod 5 is suspended vertically and inserted into the glass slot 7, as shown in FIG. 4, the detection of the edge portion 9 of the door 6 by the optical sensor 8 must be done from a position spaced a distance at least corresponding to the distance of the engaging rod 5 from the edge portion 9 of the door (the height H in FIG. 4), so the optical sensor 8 tends to be deficient in its detecting ability. In addition, since coating material mist is suspended in the air in a coating site, a long-period operation of the door opening/closing device may allow the mist to adhere gradually to the light-sensitive surface of the optical sensor 8 and deteriorate the detecting ability of the sensor. The resulting erroneous detection by the optical sensor 8 may, in turn, cause malfunctioning of the door opening/closing device.

Furthermore, although use of the type of device having the pivotable engaging rod 10 shown in FIG. 5 allows the height of the optical sensor 8 to be relatively low so that the foregoing deficiency in detecting ability is less serious, there arises the problem that the coated surface which has not yet dried becomes flawed because of contact of the engaging rod 10 with the door 6.

SUMMARY OF THE INVENTION

It is the object of the present invention to provide a door opening/closing device which permits shortening of the distance between an optical sensor (a non-contact type sensor) and the upper edge of a door, thereby ensuring the detection of the position of the door by the sensor, and which allows an engaging rod to be inserted into a glass slot without contact thereof with a coated surface of the door.

According to the construction of the automobile door opening/closing device of the present invention, a single device is provided with a robot arm capable of moving horizontally toward a door, a non-contact type sensor attached to the robot arm for detecting an upper edge shape of the door, an engaging rod attached to the robot arm and adapted to be moved vertically for insertion thereof into a glass slot of the door, and a drive means for driving the engaging rod, wherein the robot arm is moved horizontally toward the door in close proximity to the upper edge of the door, and when the non-contact type sensor detects a specific shape of the upper edge of the door, the drive means is operated to insert the engaging rod into the glass slot, then the door is opened or closed by a horizontal movement of the robot arm.

In the automobile door opening/closing equipment constructed as above, when the non-contact type sensor detects the specific upper edge shape of the door during horizontal movement of the tip end portion of the robot arm toward the door, the robot arm is stopped, and the drive means operated so that the engaging rod is inserted vertically into the glass slot. Thereafter, the robot arm is moved horizontally to open or close the door.

Since the engaging rod for insertion into the glass slot of the door is vertically movable by the drive means, there is no fear of the engaging rod coming into contact with the door which has not yet dried when the rod is engaged with or disengaged from the door glass slot. Moreover, by withdrawal of the engaging rod, the robot arm can be moved horizontally with the non-contact type sensor in closer proximity to the upper edge of the door than in the prior art. This results in greatly improved detecting ability of the non-contact type sensor to an extent sufficient to compensate for any deterioration in detecting ability of the sensor, such as caused by adherence of paint mist to the sensor, thus permitting prolongation of the sensor life and preventing malfunction of the equipment.

Further, the present invention comprises:

a main body which has a sealed case to which are attached a vertical air cylinder adapted to be extended and withdrawn in the vertical direction, a horizontal air cylinder adapted to be extended and withdrawn in the horizontal direction and an optical sensor enclosed in the case, an engaging rod connected to a piston rod of the vertical air cylinder and thereby moved vertically for insertion thereof into a glass slot of a door so as to be removable therefrom, an optical sensor provided with a light emitting portion and a light sensing portion and adapted to emit light, then sense reflected light from the door and provide a door shape signal to a robot controller, and a shutter connected to a piston rod of the horizontal air cylinder and thereby moved horizontally to expose or cover the light emitting portion or the light sensing portion of the optical sensor;

a coating robot arm with the main body attached to the tip end portion thereof, the coating robot arm functioning to move the engaging rod horizontally to a position in which the engaging rod can be inserted into the glass slot of the door;

a valve unit having a first solenoid valve for feed and discharge of compressed air to the vertical air cylinder, a second solenoid valve for feed and discharge of compressed air to the horizontal air cylinder, and a third solenoid valve for supplying purging air into the sealed case upon opening of the shutter to prevent coating material mist from entering the interior of the sealed case;

a valve controller for controlling the valve unit in accordance with a control signal; and a robot controller which controls the operation of the coating robot arm, judges whether a door shape signal provided from the optical sensor coincides with a prestored shape data, provides a movement stop signal to the coating robot arm upon coincidence of the signal with the shape data, and provides a control signal to the valve controller at the time of change-over between a coating step and a door opening/closing step.

According to the above construction, the main body is moved horizontally to the position where the engaging rod can be inserted into the glass slot through the coating robot arm. At this time, the optical sensor continues to provide door shape signals to the robot controller, and upon coincidence between the shape signal and the shape data, a movement stop signal is produced to stop the coating robot arm. Thereafter, a control signal is provided from the robot controller to the valve controller to actuate the first solenoid valve of the valve unit, resulting in the engaging rod being moved down into the glass slot of the door by means of the vertical air cylinder. Lastly, the door is opened or closed by again moving the robot arm horizontally. At this time, the horizontal air cylinder and the valve unit are controlled by the robot controller and the valve controller, and the shutter is opened during operation of the optical sensor so that purging air is fed through the third solenoid valve. While the optical sensor is not in operation, the horizontal air cylinder is actuated by the compressed air fed through the second solenoid valve to close the shutter, thereby preventing deterioration in functioning of the sensor.

BRIEF DESCRIPTION OF THE DRAWINGS

FIGS. 1 to 5 illustrate the prior art, of which:
FIG. 1 is a side view of a coating line;
FIG. 2 is a front view thereof;
FIG. 3 is a plan view thereof;
FIG. 4 is a side view of a door opening/closing device; and
FIG. 5 is a side view of another door opening/closing device.

FIGS. 6 to 9 illustrate an embodiment of the present invention, of which:
FIG. 6 is a schematic constructional diagram of a door opening/closing device embodying the invention;
FIG. 7 is a side view of a coating gun unit;
FIG. 8 is a sectional view taken along line VIII—VIII in FIG. 7; and
FIG. 9 is a vertical sectional view taken along line IX—IX in FIG. 8 with an engaging rod in a withdrawn condition.

DETAILED DESCRIPTION OF THE INVENTION

An embodiment of the present invention will be described below with reference to the drawings.

Figure 1:
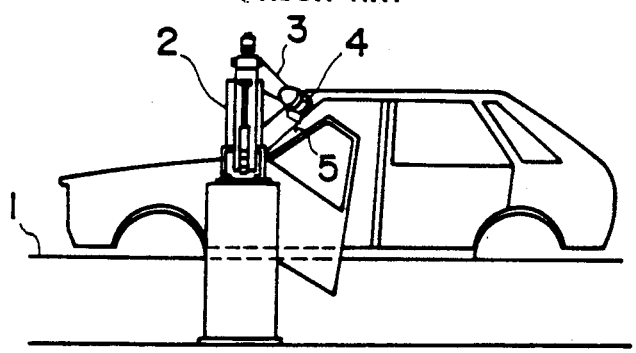
Figure 2:
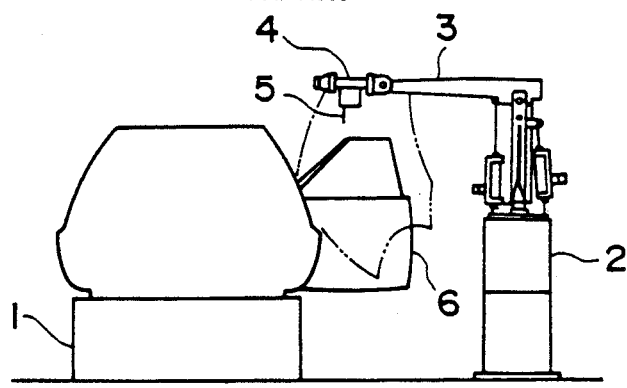
Figure 3:
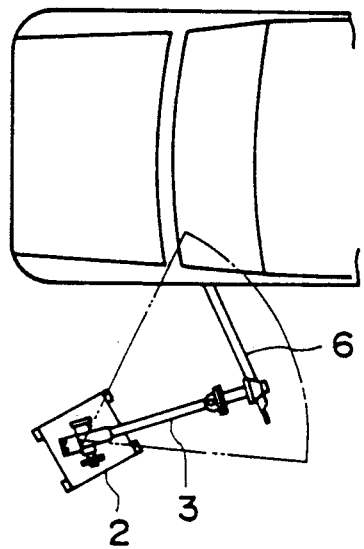
Figure 4:
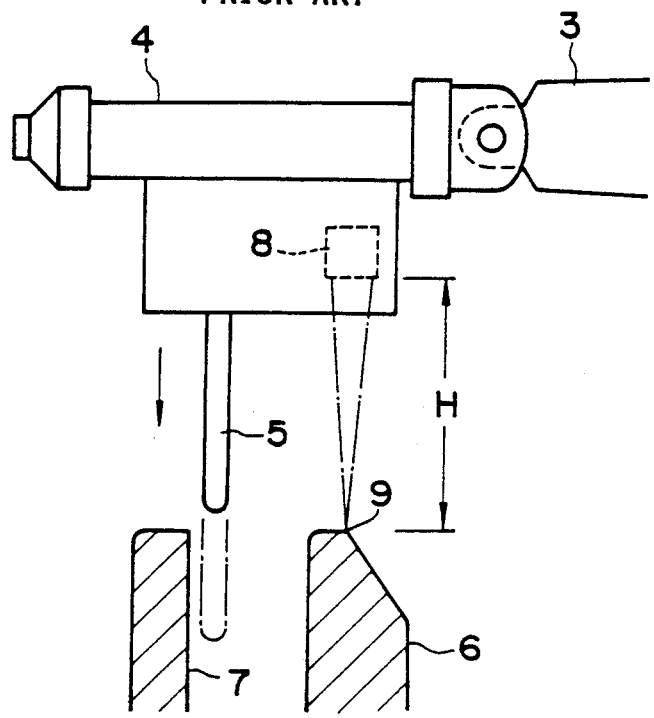
Figure 5:
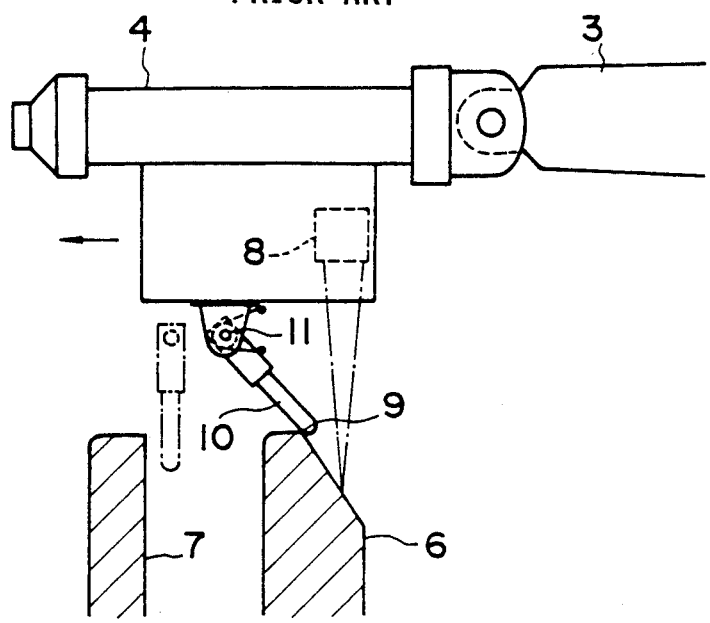
Figure 6:
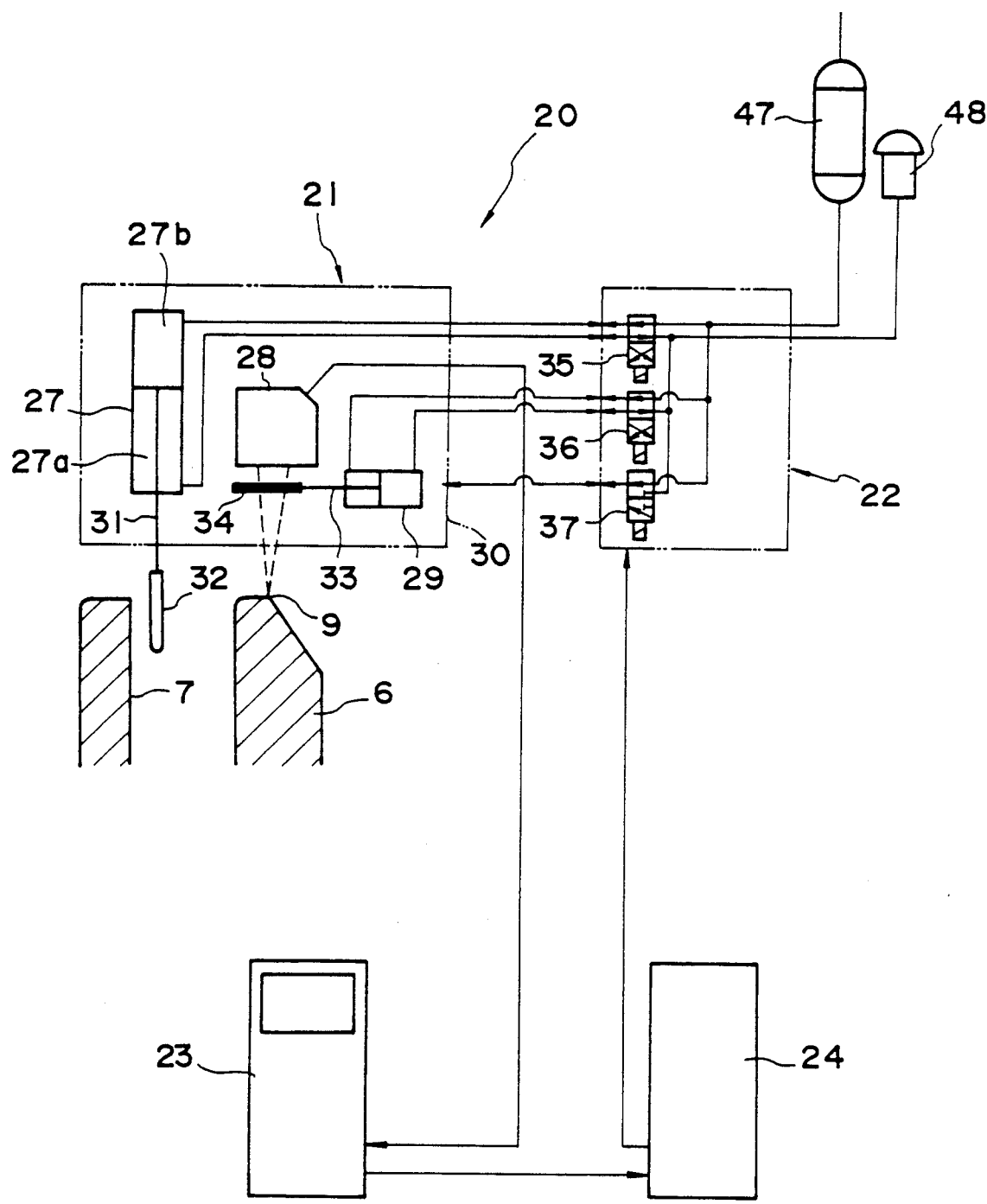

FIG. 6 is a schematic construction diagram of an automobile door opening/closing device 20. As shown in the same figure, the device 20 is composed of a main body 21, a valve unit 22, a robot controller 23 and a valve controller 24. The main body 21 is attached to the tip end portion of an arm of a coating robot (not shown).

More specifically, the equipment body 21 is composed of a double-acting vertical air cylinder 27, an optical sensor 28 and a double-acting horizontal air cylinder 29. These components are substantially enclosed within a sealed case 30. An engaging rod 32 is connected to a piston rod 31 of the vertical air cylinder 27. After the engaging rod 32 is inserted into the glass slot 7 of the door 6, the equipment body 21 is moved horizontally together with the robot arm, whereby the door 6 is opened or closed.

The optical sensor 28, having a light emitting portion and a light sensing portion, is constructed so that it can distinguish the shape of the upper edge of the door 6 upon sensing light reflected from the same upper edge. When the main body 21 has moved horizontally up to the position where the engaging rod 32 can be inserted into the glass slot 7, judgement is made as to whether a specific shape of the door 6 (in this embodiment an edge portion 9 of the door 6 formed at the boundary between the upper end portion of the vertical door surface and the horizontal face portion of the door) detected by the optical sensor 28 in correspondence to the said position is coincident with a specific shape data which has been set and stored in advance. If the answer is affirmative, a stop signal is fed to the robot controller 23.

To a piston rod 33 of the horizontal air cylinder 29 is connected a shutter 34, which can cover the light emitting and sensing portions of the optical sensor 28. In the door coating step, the shutter 34 is closed to protect the optical sensor 28 from the coating material mist, while in the door opening/closing step, the shutter 34 is opened to permit detection of the shape of the door 6.

The valve unit 22 is composed of three solenoid valves 35-37. The solenoid valve 35 is constructed to feed and discharge compressed air to the vertical air cylinder 27, while the solenoid valve 36 is constructed to feed and discharge compressed air to the horizontal air cylinder 29. Further, the solenoid valve 37 is for supplying purging air into the case 30 when the shutter 34 is open, to thereby prevent the coating material mist from entering the interior of the case 30 through the light emitting and sensing window of the optical sensor 28.

The robot controller 23 controls each part of the coating robot and provides a signal to the valve controller 24 at the time of change-over between the coating and door opening/closing steps so as to cause the valve controller 24 to control the ON-OFF conditions of the three solenoid valves 35–37.

Figure 7:
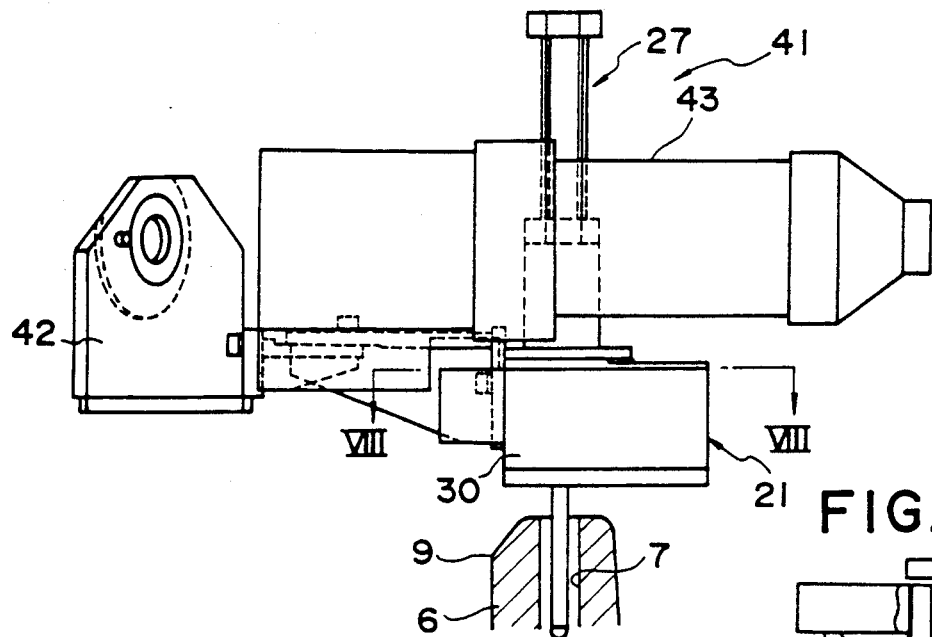

The embodiment of the main body 21 set forth above will now be described with reference to FIGS. 7 to 9. FIG. 7 shows a spray gun unit 41 attached to the tip end portion of the arm of the coating robot by a bracket 42. The spray gun unit 41 is composed of a spray gun 43 and the main body 21, which body 21 is disposed just under the spray gun 43.

Figure 8:
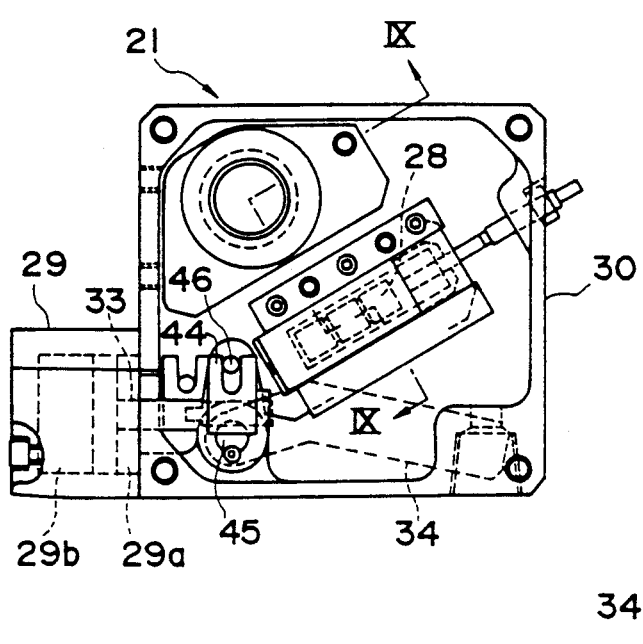

As shown in FIGS. 7 and 8, the main body 21 has a square case 30 in which the optical sensor 28 is enclosed. As shown in FIGS. 7 and 9, the vertical cylinder 27 is mounted on the upper surface of the case 30 and the vertically movable engaging rod 32 connected to the piston rod 31 of the cylinder 27 extends through the case 30. More specifically, the engaging rod 32 extends downward and is vertically moved rectilinearly by the vertical air cylinder 27 into engagement with the glass slot 7 of the door 6 positioned just thereunder. From a side face of the case 30 there projects the horizontal air cylinder 29, with its piston rod 33 projecting into the case 30, as shown in FIG. 8. Further, a U-shaped clevis 44 is mounted on the tip end portion of the piston rod 33.

On the lower surface of the case 30 there is disposed the shutter 34 as shown in FIG. 8, the shutter 34 being pivotable about a pivot pin 45. As the shutter 34 pivots counterclockwise in FIG. 8, the optical sensor 28 is covered with the shutter. An engaging pin is integrally connected at the base end portion of the shutter 34. The tip end of the engaging pin 46 is engaged with the U-shaped groove of the clevis 44. Thus, the shutter 34 is moved in the horizontal direction between open and closed positions by means of the horizontal cylinder 29.

In operation of the automobile door opening/closing device described above, the door side panel portion is first coated in a door coating step, and thereafter the door is opened and the back portion along the circumference of the door is coated. Alternatively, the door is first opened and the back portion along the circumference of the door is coated, and thereafter the door is closed and the door side panel portion is coated. Thus, in the coating step the door may be opened once, closed once, or both opened and closed once, depending on the coating procedure. For explanatory convenience, the following description of the operation of the embodiment of the present invention is of the case where the side panel portion of the door 6 is first coated, and thereafter the door 6 is opened and the back portion along the circumference of the door 6 is coated.

Figure 9:
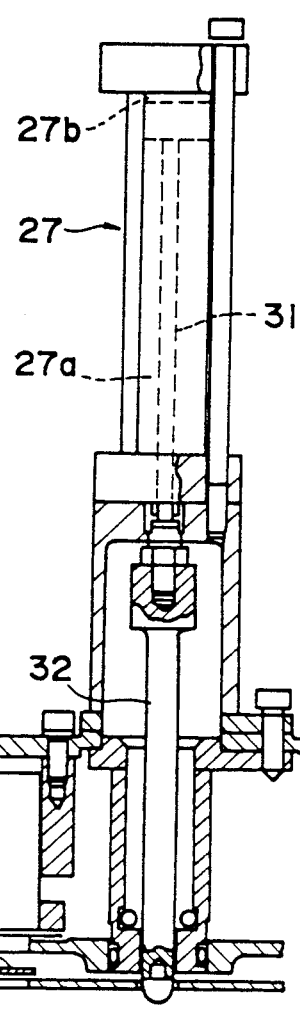

First, when the side panel portion of the door 6 in a closed state is to be coated, compressed air is supplied from an air reservoir 47 to a lower cylinder chamber 27a of the vertical cylinder 27 whereby the engaging rod 32 is withdrawn as shown in FIG. 9. Compressed air is also supplied to a right-hand cylinder chamber 29a in FIG. 8 of the horizontal cylinder 29 such that the shutter 34 is moved to a closed position which is a position pivoted counterclockwise from the position shown in FIG. 8 and the optical sensor 28 is covered by the shutter 34. At this time, the solenoid valve 37 is in an atmospheric mode, so the interior of the case 30 is held at atmospheric pressure by communication through an atmospheric valve 48. However, since the shutter 34 is closed, the entry of coating material mist into the case 30 is prevented. In such a condition the side panel portion of the door 6 can be coated without fear of the mist adhering to the optical sensor 28 since the sensor is covered by the shutter 34.

Next, in order to open the door 6, compressed air is supplied to a left-hand cylinder chamber 29b in FIG. 8 of the horizontal air cylinder 29 to pivot the shutter 34 to an open position as shown in the same figure. At the same time, the solenoid valve 37 is set to an air supply mode to supply compressed air into the case 30 and the robot arm is moved as close as possible to the height of the upper edge of the door 6. In this state, the tip end portion of the robot arm is moved horizontally toward the door 6. When the body 21 has moved to the position where the engaging rod 32 can be inserted into the glass slot 7 of the door 6, the optical sensor 28 detects the upper edge portion 9 of the door 6, and in accordance with the result of this detection a stop signal is fed to the robot controller 23 to stop the movement of the robot arm.

Next, the valve controller 24 changes over the solenoid valve 35 in accordance with a signal provided from the robot controller 23 to supply compressed air into an upper cylinder chamber 27b of the vertical air cylinder 27, whereby the engaging rod 32 is inserted into the glass slot 7 of the door 6 as shown in FIGS. 6 and 7. At this time, the optical sensor 28 is no longer needed, so the solenoid valve 36 may be changed over to cause closure of the shutter 34. The solenoid valve 37 may then be changed over to the atmospheric mode because upon closure of the shutter 34 there is no longer any fear of entry of coating material mist into the case 30.

Then, with the engaging rod 32 inserted into the glass slot 7, the robot arm is moved horizontally to open the door 6. Thereafter, the engaging rod 32 is again withdrawn, thus permitting the robot arm to move freely. In this state, the back portion along the circumference of the door 6 is coated by means of the spray gun 43.

Although an embodiment of the present invention has been described above, it is to be understood that the invention is not limited thereto and various modifications may be made. For example, although in the above embodiment the optical sensor 28 is covered with the shutter 34 as necessary, because this is for preventing the adhesion of coating material mist to the optical sensor 28 and has no substantial relation to the shortening of the spacing between the optical sensor 28 and the upper edge of the door 6, the shutter 34 is not always necessary. Moreover, although in the above embodiment the non-contact type sensor used was an optical sensor 28, it may be substituted with an ultrasonic sensor. Since the object of the present invention is to prevent the deterioration in detecting ability of the sensor due to increase in the distance between the upper edge of the door and the sensor, all non-contact type sensors whose deterioration in detecting ability as a general property comes into question, are considered to be non-contact type sensors as referred to herein. Further, although in the above embodiment the engaging rod 32 is vertically driven rectilinearly, it may be pivoted in the vertical plane which includes the glass slot 7 into a vertical position. It is not always necessary that the equipment of the present invention be attached to a coating robot; it goes without saying that the desired object can be attained even when the invention is applied to a special robot for opening and closing a door.

What is claimed is:

1. A device for opening and closing an automobile door having a glass slot and an upper edge with a predetermined shape, comprising:
   a robot arm which is movable in a horizontal plane towards and away from the door and which includes a lower surface;
   a non-contact type sensor means attached to said robot arm for detecting the predetermined shape of the upper edge of the door;
   an engaging rod attached to said robot arm and adapted to move relative thereto in a vertical direction between an extended position in which said rod is inserted in the glass slot and a retracted position in which said rod is retracted from the glass slot; and
   rod drive means for selectively driving said engaging rod relative to said robot arm between said extended position and said retracted position, said rod drive means comprising a vertically disposed cylinder having a piston with a piston rod connected to said engaging rod;
   whereby when said engaging rod is in said retracted position, said robot arm can be moved in the horizontal plane so as to position the lower surface of said robot arm proximate the upper edge of the door.

2. A device as recited in claim 1, further comprising:
   control means for controlling said rod drive means to maintain said engaging rod in said retracted position until said sensor means detects the predetermined shape and to move said engaging rod to said extended position after said sensor means detects the predetermined shape; and
   robot arm drive means for driving said robot arm in a horizontal direction after said engaging rod is inserted into the glass slot.

3. A device as recited in claim 1, wherein said robot arm is an arm of a coating robot.

4. A device as recited in claim 1, wherein said non-contact type sensor means comprises an optical sensor.

5. A device as recited in claim 1, wherein said non-contact type sensor means comprises means for detecting an edge portion of the door formed at a boundary between an upper end of a vertical surface of the door and a horizontal face surface of the door.

6. A device as recited in claim 1, wherein said rod drive means selectively drives said engaging rod along a vertical line between said retracted position and said extended position.

7. A device as recited in claim 1, wherein said non-contact type sensor means and said engaging rod are attached to a lower portion of said robot arm in close proximity to one another.

8. A device as recited in claim 1, wherein said non-contact type sensor means comprises an ultrasonic sensor.

9. A device for opening and closing an automobile door having a glass slot and an upper edge with a predetermined shape, comprising:
   a coating robot for providing a paint coating to the door and having an arm which is movable in a horizontal plane towards and away from the door; and
   a casing attached to said arm and in which are mounted:
   an engaging rod adapted to move in a vertical direction relative to said robot arm between an extended position in which said rod is inserted in the glass slot and a retracted position in which said rod is retracted from the glass slot;
   rod drive means, comprising a vertically disposed cylinder having a piston with a piston rod connected to said engaging rod, for selectively driving said engaging rod between said extended position and said retracted position;
   an optical sensor means, having a means for emitting light and a means for sensing light, for detecting the predetermined shape;
   a shutter adapted to move in a horizontal plane between a covering position in which said shutter covers one of said light sensing means and said light emitting means and an exposing position in which said shutter exposes said one of said light sensing means and said light emitting means; and
   shutter drive means, comprising a horizontally disposed cylinder having a piston with a piston rod attached to said shutter, for selectively driving said shutter between said covering position and said exposing position.

10. A device as recited in claim 9, wherein
    said vertically disposed cylinder comprises a first pneumatic cylinder; and
    said horizontally disposed cylinder comprises a second pneumatic cylinder.

11. A device as recited in claim 9, further comprising means for supplying compressed air; and
    a valve unit comprising:
    a first solenoid valve means for feeding compressed air to and discharging compressed air from said vertically disposed cylinder;
    a second solenoid valve means for feeding compressed air to and discharging compressed air from said horizontally disposed cylinder; and
    a third solenoid valve means for supplying compressed air into said casing when said shutter is in said exposing position to rid the interior of said casing of any impurities.

12. A device as recited in claim 11, further comprising
    arm control means for terminating horizontal movement of said arm of said coating robot, and providing a terminating signal indicative thereof, upon detection of the predetermined shape by said optical sensor means and for initiating horizontal movement of said arm, and providing an initiating signal indicative thereof, when it is desired for said coating robot to perform a coating of the door and when said coating robot completes a coating of the door; and
    a valve control means for controlling said first, second and third solenoid valve means in dependence on said terminating signal and said initiating signal.

13. A device as recited in claim 9, wherein said shutter is pivotally mounted to said casing about a vertical pivot axis.

14. A device as recited in claim 1, wherein
    said robot arm includes a base end and a free end spaced from said base end; and
    said non-contact type sensor means, said engaging rod and said rod drive means are attached to said free end of said robot arm.

15. A device as recited in claim 14, wherein
    said drive means is operable to move said engaging rod independently relative to said non-contact type sensor means.

* * * * *

UNITED STATES PATENT AND TRADEMARK OFFICE
CERTIFICATE OF CORRECTION

PATENT NO. : 4,988,260
DATED : January 29, 1991
INVENTOR(S) : Hiroshi Kiba; Yutaka Shintaku It is certified that error appears in the above-identified patent and that said Letters Patent is hereby corrected as shown below:

On the front page, left column, item [73], change "Mazda Motor Corporation, Hiroshima, Japan" to Mazda Motor Corporation, Hiroshima, Japan, and one-half interest to Kabushiki Kaisha Kobe Seiko Sho, Kobe, Japan--. (part interest)

Signed and Sealed this

Fifth Day of November, 1991

*Attest:*

HARRY F. MANBECK, JR.

*Attesting Officer*      *Commissioner of Patents and Trademarks*